United States Patent
Shen et al.

(10) Patent No.: US 10,310,280 B2
(45) Date of Patent: Jun. 4, 2019

(54) OFFSET LASER ARRAY WITH BEAM COMBINING OPTICAL ELEMENT

(71) Applicant: II-VI Suwtech, Inc., Shanghai (CN)

(72) Inventors: Yuan Shen, Shanghai (CN); Dashan Li, Shanghai (CN); Jintao Yang, Shanghai (CN); Yaping Zhao, Shanghai (CN); Xiaobin Sun, Shanghai (CN)

(73) Assignee: II-VI Suwtech, Inc., Shanghai (CN)

( * ) Notice: Subject to any disclaimer, the term of this patent is extended or adjusted under 35 U.S.C. 154(b) by 23 days.

(21) Appl. No.: 15/710,519

(22) Filed: Sep. 20, 2017

(65) Prior Publication Data

US 2018/0143445 A1 May 24, 2018

(30) Foreign Application Priority Data

Nov. 18, 2016 (CN) .......................... 2016 1 1036885

(51) Int. Cl.
| | |
|---|---|
| *G02B 27/09* | (2006.01) |
| *H01S 3/02* | (2006.01) |
| *G02B 27/14* | (2006.01) |
| *G02B 19/00* | (2006.01) |
| *G02B 27/10* | (2006.01) |
| *G02B 27/30* | (2006.01) |

(52) U.S. Cl.
CPC .......... *G02B 27/14* (2013.01); *G02B 19/0057* (2013.01); *G02B 27/10* (2013.01); *G02B 27/108* (2013.01); *G02B 27/143* (2013.01); *G02B 27/30* (2013.01)

(58) Field of Classification Search
CPC ........... G02B 27/0922; G02B 27/0916; G02B 27/10; G02B 27/0905; H01S 3/025; H01S 3/2383; H01S 5/4068
See application file for complete search history.

(56) References Cited

U.S. PATENT DOCUMENTS

| | | | | |
|---|---|---|---|---|
| 4,978,197 A * | 12/1990 | Horikawa | .......... | B23K 26/0604 359/629 |
| 5,629,791 A * | 5/1997 | Harrigan | ................ | G02B 27/09 359/223.1 |
| 6,124,973 A * | 9/2000 | Du | .......... | G02B 27/09 359/618 |
| 6,229,831 B1 * | 5/2001 | Nightingale | ......... | G02B 6/4249 372/109 |
| 6,356,577 B1 * | 3/2002 | Miller | .................... | G02B 5/045 372/100 |
| 6,851,610 B2 * | 2/2005 | Knowles | ................ | G02B 26/10 235/462.01 |

(Continued)

FOREIGN PATENT DOCUMENTS

| | | |
|---|---|---|
| CN | 102751660 A | 10/2012 |
| CN | 103944067 A | 7/2014 |

*Primary Examiner* — Ismael Negron
(74) *Attorney, Agent, or Firm* — Weisun Rao; Jun Chen; Venture Partner, LLC

(57) ABSTRACT

A laser array includes laser diodes arranged in a stepped form; a shaping optical system deposited at the emitting side of each one of the diodes in the laser array; and a beam combining optical element deposited at the emitting side of the shaping optical system, the beam combining optical element having reflecting surfaces arranged in a stepped form and corresponding to each of the laser diodes.

7 Claims, 3 Drawing Sheets

(56) References Cited

U.S. PATENT DOCUMENTS

| | | | |
|---|---|---|---|
| 6,993,059 B2* | 1/2006 | Anikitchev | G02B 27/0977 |
| | | | 372/100 |
| 7,959,297 B2* | 6/2011 | Silverstein | G02B 27/1033 |
| | | | 353/31 |
| 8,132,919 B2* | 3/2012 | Harland | G02B 7/1825 |
| | | | 353/119 |
| 9,065,237 B2* | 6/2015 | Guo | H01S 5/4043 |
| 9,235,053 B2* | 1/2016 | Wolf | G02B 27/0905 |
| 9,645,389 B2* | 5/2017 | Kumeta | H01S 5/0071 |
| 9,664,988 B2* | 5/2017 | Huang | G03B 21/2033 |

\* cited by examiner

OFFSET LASER ARRAY WITH BEAM COMBINING OPTICAL ELEMENT

CROSS-REFERENCE TO RELATED APPLICATION

This application claims priority to Chinese Application No. 201611036885.6, filed on Nov. 18, 2016, the contents of which are incorporated herein by reference in their entirety.

TECHNICAL FIELD OF THE INVENTION

The present invention relates to the field of laser devices, especially a stepped semiconductor vertical stack laser array and a laser beam combining device with the laser array.

BACKGROUND OF THE INVENTION

A high-power laser diode array has the advantages of having a small volume, high efficiency, a long life and so on, and is widely used in industrial manufacturing. Usually by stacking several bars, the output power of a semiconductor laser device can be increased to fulfill increasingly high requirements of the laser diode device. However, with the limitation of heat dissipation and the thickness of the bars themselves, the periods between two bars during the several bars being stacked cannot be too small, and generally are around 2 mm, and even bigger than 3 mm for the latest high output power bars. And the height of a fast axis collimating lens is above 1.5 mm. Meanwhile, after being collimated by the fast axis collimating lens, the beams along a fast axis direction cannot fill the whole height of the fast axis collimating lens, and generally occupy about 50%~75% of the whole height of the fast axis collimating lens. So, there are considerable interspaces between the beams outputted by the vertical stack comprising the laser diode array after passing through the fast axis collimating lens.

In this case, appropriate light beam coupling method (that is, beam combining technology) can be adopted to rearrange the beams of adjacent laser diode arrays by using an optical element to decrease the interspaces between, and increase the average luminance of the vertical stack output light beams.

Nowadays, the common beam combining technologies of the semiconductor vertical stack laser device are polarization beam combining technology, wavelength beam combining technology and space beam combining technology.

Polarization beam combining technology, mainly is based on the polarization property of the laser device, to make two-branch lasers with different polarization directions to be combined together and propagated along a same optical path direction, for example, as introduced in the U.S. Pat. No. 6,993,059 B2, by using a wave plate and a polarization coupling prism, the beams of upper half and lower half of the stack are outputted overlapped, usually the polarization beam combining technology is to make two-branch laser beams or laser beam combinations with perpendicular polarization directions to combine with each other, and is always used with other beam combining technologies.

Wavelength beam combining technology, is to combine laser beams with different wavelengths by using optical elements such as a dichroscope, a grating and so on, the power and luminance can be improved effectively, and it's the main developing direction of high-power direct semiconductor laser devices nowadays. However no mater adopting a dichroscope, a volume Bragg grating or a diffraction grating, it will always be limited by the spectrum, different wavelengths need to be independent with each other and enough wavelength spacing need to be kept.

Space combining technology, for example, as introduced in U.S. Pat. No. 6,124,973 by Keming Du et al, is to form a group of laser beams propagating along a same direction by arranging and stacking several semiconductor laser devices in space according to a certain sequence, so a high-power laser output can be gotten. However generally speaking, the space stacking cannot improve the quality of beams, so the high-power laser output gotten from this is generally directly used in the cases with requirements of not high beam quality, such as being used as the pump source of fiber laser and so on. But, to the semiconductor vertical stack, for the height along vertical direction of a light beam is decided by the semiconductor vertical stack laser device itself, so there are obvious spacing between adjacent beams, so to a semiconductor vertical stack laser device, a laser source with high energy density can be gotten by using space beam combining technology. For example as published in a Chinese patent CN102751660A, and for another example as published in a Chinese patent CN103944067A, but with the limitation of the problem of whether the spacing size of the stack and the size of the fast axis facula is matched or not, the spacing in the beams may not be eliminated completely.

BRIEF SUMMARY OF THE INVENTION

In view of the defects of the existing technology, the object of the present invention is to provide a laser array and a laser beam combining device, the laser beam combining device can decrease or eliminate the spacing between the lasers outputted by each laser diode device, to get a high-energy-density laser source.

One aspect of the present invention provides a laser array, said laser array comprises several laser diode devices, each said laser diode device has an emitting surface at the emitting side of said laser array, and several said emitting surfaces are arranged in a stepped form.

Preferably, the ends of several said laser diode devices away from the emitting side of said laser array are arranged in a stepped form.

Preferably, the ends of several said laser diode devices away from the emitting side of said laser array are flush with each other.

Preferably, said laser diode device comprises a heat sink and a semiconductor laser chip set on said heat sink.

Preferably, said semiconductor laser chip is at least one single emitter or bar.

Another aspect of the present invention further provides a laser beam combining device, the laser beam combining device comprises: said laser array; a shaping optical system, set at the emitting side of said laser array; a beam combining optical element, set at the emitting side of said shaping optical system, said beam combining optical element comprises several reflecting surfaces corresponding to the laser diodes of said laser array, and several said reflecting surfaces are arranged in a stepped form.

Preferably, several laser diode devices of said laser array are arranged along a first direction, the emitting light of each said laser diode is shot out along a second direction, wherein, the spacing along said second direction between several said reflecting surfaces are smaller than the spacing along said first direction between several said laser diode devices.

Preferably, the several reflecting surfaces of said beam combining optical element connects with each other seamlessly on a plane vertical with their reflection direction.

Preferably, the emitting light of each said laser diode device of said laser beam combining device has a same optical path length.

Preferably, the angle between each said reflecting surface of said beam combining optical element and the emitting direction of the emitting light of said shaping optical system is 45°.

Preferably, said beam combining optical element comprises several reflection mirrors, each said reflection mirror is set at the emitting surface of each said laser diode device.

Preferably, said beam combining optical element is a reflection mirror with several said reflecting surfaces, wherein, each said reflecting surface is set at the emitting surface of each said laser diode device.

Preferably, said shaping optical system comprises several fast axis collimating lenses in one-to-one correspondence with said laser diode devices, each said fast axis collimating lens is set at the emitting side of each said laser diode device.

Preferably, said shaping optical system further comprises several slow axis collimating lenses, each said slow axis collimating lens is set at the emitting side of each said fast axis collimating lens.

Preferably, said shaping optical system further comprises several beam transform system, each said beam transform system is set between each said fast axis collimating lens and each said slow axis collimating lens.

The embodiments of the present invention disclose a laser array and a laser beam combining device, the laser outputted by each laser diode device of the laser array of said laser beam combining device is collimated by said shaping optical system, and then reflected by the beam combining optical element with several reflecting surfaces corresponding to the laser diode device, by adjusting the angles and locations of several reflecting surfaces of the beam combining optical element, beams parallel with each other and with decreased or eliminated spacing can be gotten, the energy density and the filling coefficient along the direction of the fast axis of the laser beam combining device of the laser beams outputted by the laser beam combining device can be increased, and then the quality of the laser beams is improved effectively. And the optical path of the laser beam combining device is simple and economic, and the quality of the beams in other aspects (such as parallelism, collimation and so on) won't be influenced, and the beam quality (such as parallelism, collimation and so on) can even be further improved by process control. Besides, in this embodiment, for the several reflecting surfaces of the beam combining optical element are arranged in a stepped form, and then, with the use of the laser array of the embodiments of the present invention (the emitting surfaces of the several laser diode devices of the laser array is also arranged in a stepped form), the differences between the optical path length of the laser beam of each laser diode device caused by the several reflecting surfaces of the beam combining element can be compensated, so laser beams parallel with each other, having a same optical path length and having no spacing can be gotten.

BRIEF DESCRIPTIONS OF THE DRAWINGS

DETAILED DESCRIPTION OF THE INVENTION

According to the innovative spirit of present invention, said laser beam combining device comprises: a laser array, said laser array comprises several laser diode devices. As used herein, the word "several" means a number in the range of 1~100, preferably 1~20. Each of the several laser diode devices has one emitting surface at the emitting side of said laser array, and several said emitting surfaces are arranged in a stepped form; a shaping optical system, set at the emitting side of said laser array; a beam combining optical element, set at the emitting side of said shaping optical system, said beam combining optical element comprises several reflecting surfaces corresponding to said laser diode devices, and several said reflecting surfaces are arranged in a stepped form.

Hereinafter, the technical contents of present invention will be further described with reference to the accompanying drawings and the embodiments as follows.

Example 1

Figure 1:
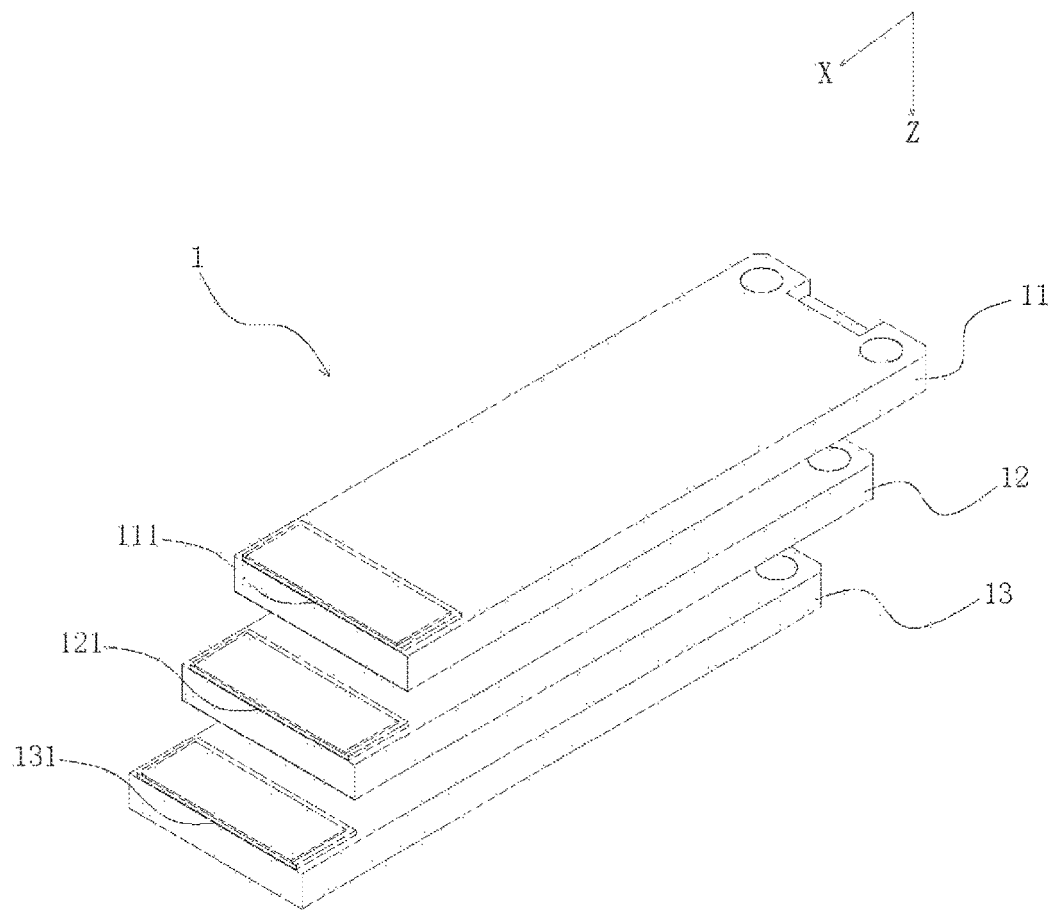
FIG. 1 is a structure schematic view of a laser array according to a first embodiment of present invention.

Please refer to FIG. 1, which shows a structure schematic view of the laser array according to the first embodiment of present invention. In the preferable embodiment shown in FIG. 1, the laser array 1 comprises several laser diode devices. Specifically, each laser diode device can generate a laser beam with a certain spectrum width. Said laser diode device comprises a heat sink and a semiconductor laser chip set on the heat sink. Wherein, said semiconductor laser chip is at least one single emitter or bar, which can be welded on the heat sink. It should be noted that, said bar can also be a mini bar.

Several laser diode devices are arranged along a first direction (direction Z in FIG. 1). FIG. 1 shows with three laser diode devices 11, 12, 13 as an example, it should be noted that, in the embodiments of the invention, the number of the laser diode devices is not limited by this, and can be set according to reality needs, for example, the number is further increased along direction Z in FIG. 1. Besides, in the embodiments of the invention, the spacing along direction Z in FIG. 1 between the several laser diode devices (such as the spacing between laser diode device 11 and laser diode device 12, or the spacing between the laser diode device 12 and the laser diode device 13) can be adjusted according to reality needs, which will not be repeated here.

Further, at the emitting side of the laser array 1, each laser diode device has an emitting surface, and several emitting surfaces are arranged in a stepped form. The emitting lights of each laser diode device are shot out along a second direction (direction X in FIG. 1). Specifically, as shown in FIG. 1, three laser diode devices 11, 12 and 13 each has an emitting surface, respectively are the emitting surfaces 111, 121 and 131, wherein, the emitting surface is the surface on which the semiconductor laser device chip on the heat sink is set. The emitting surfaces 111, 121 and 131 are arranged in a stepped form. It should be noted that, the emitting surfaces 111, 121 and 131 being arranged in a stepped form means along the arrangement direction of the several laser diode devices (the first direction, that is direction Z in FIG. 1), the emitting surfaces of several laser diode devices extend to the second direction (direction X in FIG. 1). For example, the emitting surface 121 of the laser diode device 12 extends along direction X compared to the emitting surface 111 of the laser diode device 11; while the emitting surface 131 of the laser diode device 13 in FIG. 1 extends along direction X compared to the emitting surface 121 of the laser diode device 12.

Further, in the embodiment shown in FIG. 1, to save the cost, each laser diode device of the laser array 1 uses a completely same laser diode device, and the emitting surfaces of several laser diode devices are arranged in a stepped form, hence, accordingly, the ends of the several laser diode devices away from the emitting side of said laser array are arranged in a stepped form.

Further, the invention provides a laser beam combining device, the laser beam combining device comprises the laser array shown in FIG. 1. Specifically, please refer to FIG. 2, which shows a structure schematic view of the laser beam combining device according to the first embodiment of present invention. In the preferable embodiment shown in FIG. 2, the laser beam combining device comprises: a laser array 1, a shaping optical system 2 and a beam combining optical element 3. Wherein, the laser array 1 can be the structure shown in FIG. 1 above.

The shaping optical system 2 is set at the emitting side of the laser array. The shaping optical system 2 is used to optically shape the laser beam generated by the laser array 1. Specifically, the shaping optical system 2 comprises several fast axis collimating lenses which are one-to-one corresponding to the several laser diode devices. Each fast axis collimating lenses is set at the emitting side of each laser diode device. Wherein, the fast axis collimating lenses is used to collimate the divergent beams along the fast axis to make them to become laser beams basically parallel with each other. In the embodiment shown in FIG. 2, the shaping optical system 2 comprises three fast axis collimating lenses 21, 22 and 23. Wherein, the fast axis collimating lens 21 is set at the emitting side of the laser diode device 11; the fast collimating lens 22 is set correspondingly at the emitting side of the laser diode device 12; the fast axis collimating lens 23 is set correspondingly at the emitting side of the laser diode device 13.

It should be noted that, in the other embodiments of the invention, the shaping optical system 2 may also has more optical elements according to reality demands. For example, in one embodiment of present invention, the shaping optical system 2 can further comprises several slow axis collimating lenses, and each said slow axis collimating lens is set at the emitting side of a fast axis collimating lens. Or, in another embodiment of present invention, based on comprising the above slow axis collimating lenses, the shaping optical system 2 can further comprises several beam transform systems, each beam transform system is set between a fast axis collimating lens and a slow axis collimating lens. These embodiments can all be realized and similar effects can be realized too, which will not be repeated here again.

Figure 2:
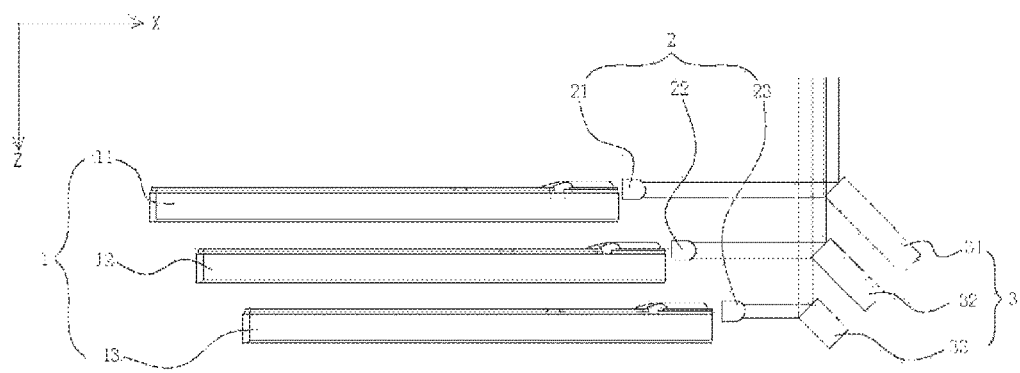
FIG. 2 is a structure schematic view of a laser beam combining device according to a first embodiment of present invention.

The beam combining optical element 3 is set at the emitting side of the shaping optical system 2. The beam combining optical element 3 comprises several reflecting surfaces corresponding to said laser diode devices, and several said reflecting surfaces are arranged in a stepped form. The beam combining optical element 3 rearranges the laser beams passing through the shaping optical system 2 with the method of reflection. The angle between each said reflecting surface of the beam combining optical element 3 and the emitting direction of the emitting lights of the shaping optical system 2 is 45°. Specifically, in the embodiment shown in FIG. 2, the beam combining optical element 3 comprises several reflecting mirrors, each reflecting mirror is set at the emitting side of a laser diode device. As FIG. 2 uses three laser diode devices as an example, hence, accordingly, in this embodiment, the beam combining element 3 comprises three reflecting mirrors. As shown in FIG. 2, the reflecting mirror 31 is set at the emitting side of the laser diode device 11; the reflecting mirror 32 is set at the emitting side of the laser diode device 12; the reflecting mirror 33 is set at the emitting side of the laser diode device 13.

In the embodiment shown in FIG. 2, the reflecting mirrors 31, 32 and 33 are arranged in a stepped form. It should be noted that, the reflecting mirrors 31, 32 and 33 being arranged in a stepped form means along the arrangement direction of reflecting mirrors 31, 32 and 33 (direction along Z axis in FIG. 2), the reflecting mirrors 31, 32 and 33 are arranged towards the opposite direction of direction shown as X axis in FIG. 2 one by one. For example, the reflecting mirror 32 in FIG. 2 is closer to the emitting side of the shaping optical system 2 compared to the reflecting mirror 31, that is the distance between the reflecting mirror 31 and the emitting surface 111 of the laser diode device 11 is bigger than the distance between the reflecting mirror 32 and the emitting surface 121 of the laser diode device 12; however the reflecting mirror 33 in FIG. 2 is closer to the emitting side of the shaping optical system 2 compared to the reflecting mirror 32, that is the distance between the reflecting mirror 32 and the emitting surface 121 of the laser diode device 12 is bigger than the distance between the reflecting mirror 33 and the emitting surface 131 of the laser diode device 13.

Figure 3:
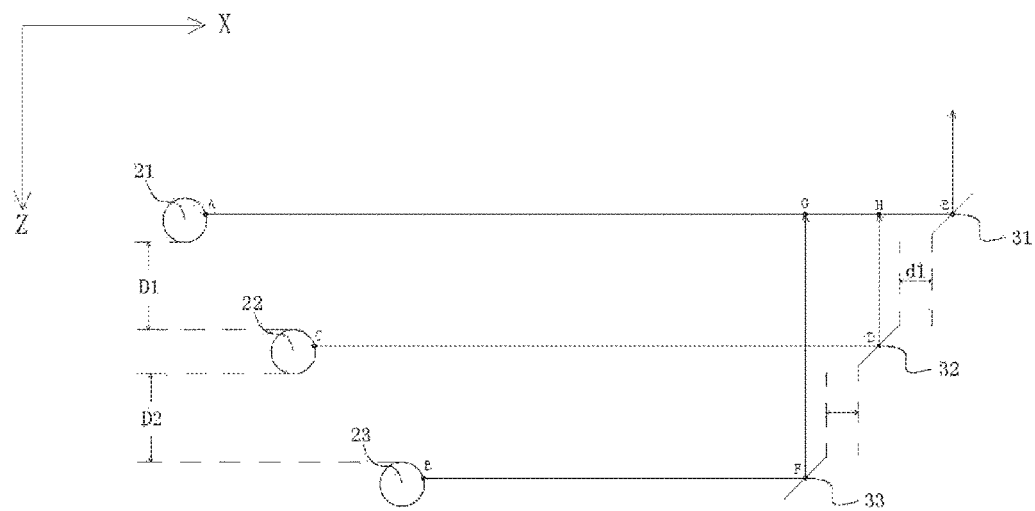
FIG. 3 is a structure schematic view of the optical path of the laser beam combining device according to a first embodiment of present invention.

Further, the spacing between the several reflecting surfaces along the second direction are smaller than the spacing between the several laser diode devices along the first direction. So the spacing between each reflection beam reflected by the reflecting surfaces can be decreased, the energy density of the laser beam outputted by the laser beam combining device and the filling coefficient along the axis direction of the laser beam combining device can be increased, and then the quality of the laser beam can be improved. Specifically, FIG. 3 shows the optical path of the laser beam combining device according to a first embodiment of present invention. FIG. 3 can be understood as the optical path view of the laser beam combining device shown in FIG. 2. As shown in FIG. 3, emitting lights are shot by the laser diode devices 11, 12, 13 along the second direction, and shot out after being reflected by the reflecting surfaces of the corresponding reflecting mirrors 31, 32 and 33. Wherein, the distance along the second direction (direction X shown in FIG. 3) between the reflecting surface of the reflecting mirror 31 and the reflecting surface of the reflecting mirror 32 is d1; the distance along the second direction (direction X shown in FIG. 3) between the reflecting surface of the reflecting mirror 32 and the reflecting surface of the reflecting mirror 33 is d2; the distance along the first direction (direction Z in FIG. 3) between the laser diode device 11 and the laser diode device 12 is D1; the distance along the first direction (direction Z in FIG. 3) between the laser diode device 12 and the laser diode device 13 is D2. To realize the target of decreasing the spacing between the reflected beams reflected by the reflecting surfaces, in the embodiment of the invention, d1 is less than D1, and d2 is less than D2.

Further preferably, the several reflecting surfaces of the beam combining optical element 3 connects with each other seamlessly on a plane vertical to their reflection direction, to eliminate the spacing of several laser beams being reflected. Specifically, in the embodiment shown in FIG. 2, the laser beams outputted by the laser diode devices 11, 12 and 13 are shot along a direction opposite with Z axis after being reflected by the reflecting mirrors 31, 32 and 33. And then, the reflecting surfaces of the reflecting mirrors 31, 32 and 33 connects with each other seamlessly on a plane vertical to the direction of Z axis. Combining the optical path view shown in FIG. 3, that is, the distance d1 along the second direction between the reflecting surface of the reflecting mirror 31 and the reflecting surface of the reflecting mirror 32, and the distance d2 along the second direction between the reflecting surface of the reflecting mirror 32 and the reflecting surface of the reflecting mirror 33 are 0.

Further preferably, the emitting light outputted by each laser diode device of the laser beam combining device has a same optical path length. Specifically, in the embodiment shown in FIG. 3, the optical path distance between one point A of the laser diode device 11 and the reflection point B on the reflecting mirror 31 is $S_{AB}$; the optical path distance between one point C of the laser diode device 12 and the reflection point D on the reflecting mirror 32 is $S_{CD}$; the optical path distance between one point E of the laser diode device 13 and the reflection point F on the reflecting mirror 33 is $S_{EF}$; the vertical distance between the reflection point D and the optical path of A, B is $S_{DH}$; the vertical distance between the reflection point F and the optical path of A, B is $S_{FG}$. And then, in this embodiment, the following relationship is preferably fulfilled the following relationship: $S_{AB}=S_{CD}+S_{DH}=S_{EF}+S_{FG}$, so the emitting light of each laser diode device of the laser array 1 has a same optical path length after being reflected by each reflecting surface, and then the laser quality of the laser beam combining device can be increased.

In this embodiment, the laser shot from each laser diode device of the laser array of the laser beam combining device is collimated by the shaping optical system, and then reflected by the beam combining optical element with several reflecting surfaces corresponding to the laser diode device, by adjusting the angles and locations of several reflecting surfaces of the beam combining optical element, laser beams parallel with each other and with decreased or eliminated spacing can be gotten, the energy density of the laser beams outputted by the laser beam combining device and the filling coefficient along the fast axis of the laser beam combining device can be increased, and then, the quality of the laser beams can be improved. And the optical path of the laser beam combining device is simple and economic, it won't influence the quality of light beams in other aspects (such as parallelism, collimation and so on), the quality of the beams (such as parallelism, collimation and so on) can even be improved by process control. Besides, in this embodiment, for the several reflecting surfaces of the beam combining optical element are arranged accordingly in a stepped form, and then, after using the laser array in FIG. 1 (the emitting surfaces of the several laser device are arranged in a stepped form too), the optical path length difference between each laser diode device caused by several reflecting surfaces of the beam combining optical element can be compensated, and laser beams parallel with each other, with same optical path length and no spacing can be gotten.

Example 2

Figure 4:
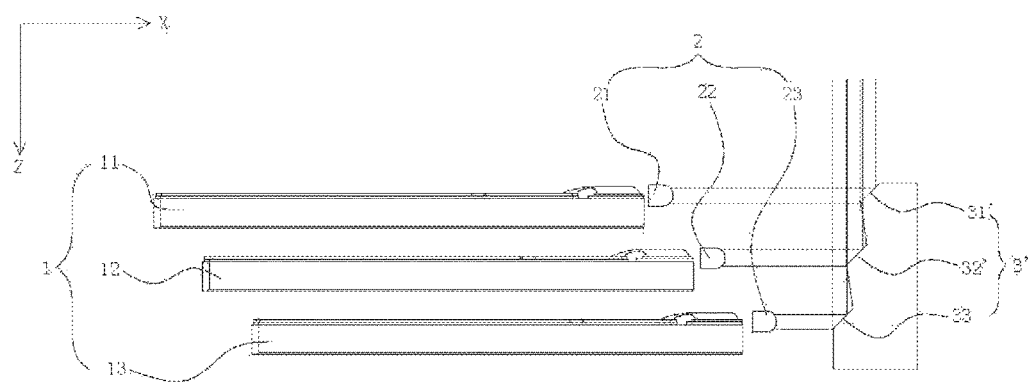
FIG. 4 is a structure schematic view of a laser beam combining device according to a second embodiment of present invention.

Please refer to FIG. 4, which shows a structure schematic view of the laser beam combining device according to the second embodiment of present invention. The difference with the first embodiment shown in FIG. 1 is, the beam combining optical element is a reflecting mirror with several reflecting surfaces, wherein, each said reflecting surface is set at the emitting side of said laser diode device. Specifically, as shown in FIG. 4, the beam combining optical element is a reflecting mirror 3'. The reflecting mirror 3' has several reflecting surfaces. In the embodiment shown in FIG. 4, as FIG. 4 also shows three laser diode devices as an example, so, correspondingly, in this embodiment, the reflection mirror 3' comprises three reflecting surfaces 31', 32' and 33'. Wherein, the reflecting surface 31' is set at the emitting side of the laser diode device 11; the reflecting surface 32' is set at the emitting side of the laser diode device 12, the reflecting surface 33' is set at the emitting side of the laser diode device 13. Similarly, the reflecting surfaces 31', 32' and 33' are arranged in a stepped form, and preferably, the projection of reflecting surfaces 31', 32' and 33' connect with each other seamlessly on a plane vertical with the direction of the Z axis. The embodiment can realize a technical effect similar with the first embodiment above, which will not be repeated here.

Example 3

Figure 5:
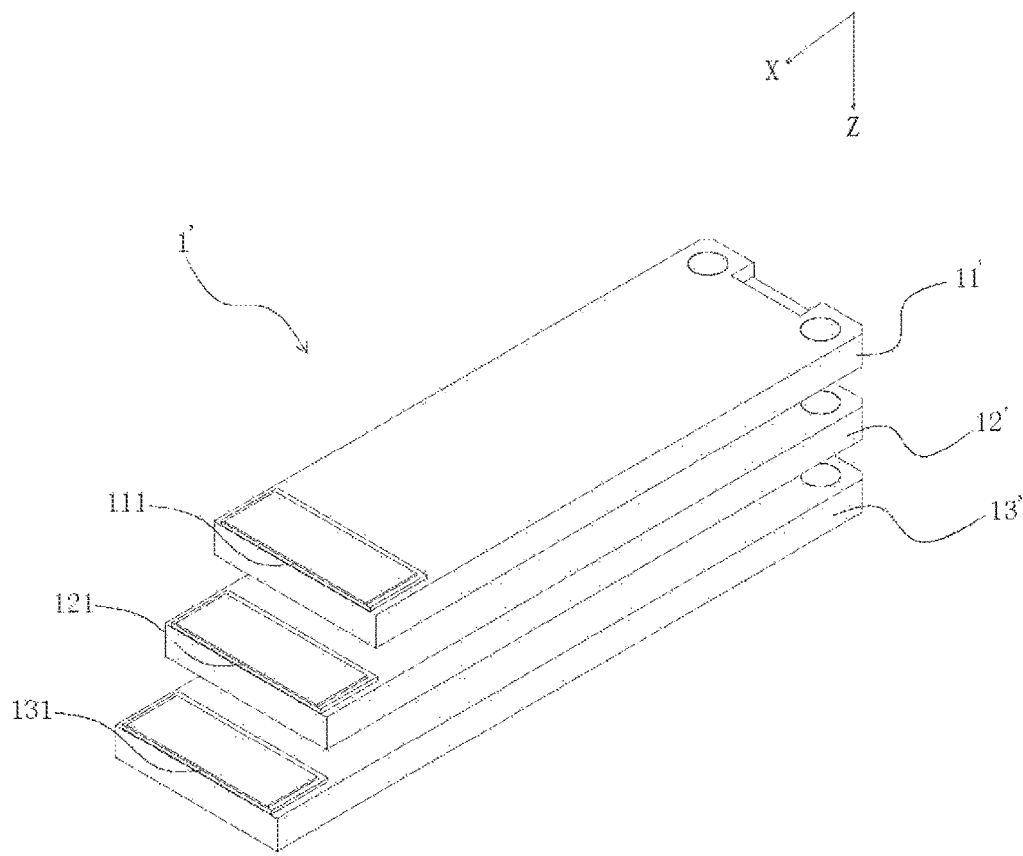
FIG. 5 is a structure schematic view of a laser array according to a third embodiment of present invention.
Figure 6:
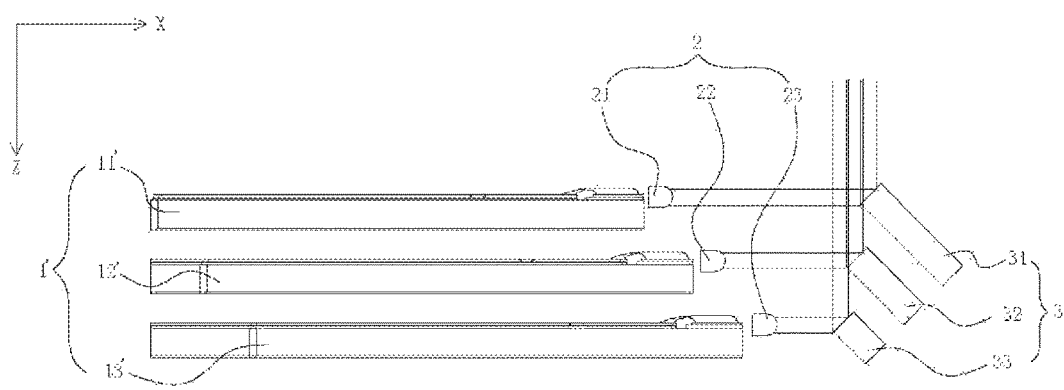
FIG. 6 is a structure schematic view of a laser beam combining device according to a third embodiment of present invention.

Please refer to FIG. 5 and FIG. 6 together, which respectively show a structure schematic view of a laser array 1' and the laser beam combining device according to a third embodiment of present invention. The difference from the first embodiment shown in FIG. 1 and FIG. 2 is, in this embodiment, the ends of several said laser diode devices away from the emitting side of said laser array 1' are flush with each other. Specifically, in the embodiment shown in FIG. 5 and FIG. 6, the emitting surfaces 111, 121 and 131 of the laser diode devices 11', 12', and 13' are still arranged in a stepped form, while the ends of the laser diode devices 11', 12', and 13' away from said laser array are flush with each other. The embodiment can realize a technical effect similar with the first embodiment above, which will not be repeated here.

In conclusion, the invention's embodiments of the present invention describe a laser array and a laser beam combining device, the laser outputted by each laser diode device of the laser array of said laser beam combining device is collimated by said the shaping optical system, and then reflected by the beam combining optical element with several reflecting surfaces corresponding to the laser diode devices, by adjusting the angles and locations of several reflecting surfaces of the beam combining optical element, beams parallel with each other and with decreased or eliminated spacing can be gotten, the energy density of the laser beams outputted by the laser beam combining device and the filling coefficient in the fast axis of the laser beam combining device can be increased, and then the quality of the laser beams is improved effectively. And the optical path of the laser beam combining device is simple and economic, and the quality of the beams in other aspects (such as parallelism, collimation and so on) won't be influenced, and the quality of the beams (such as parallelism, collimation and so on) can even be further improved by process control. Besides, in this embodiment, for the several reflecting surfaces of the beam combining optical element are arranged in a stepped form, and then, with the use of the laser array of the embodiment of the invention (the emitting surfaces of the several laser diode devices of the laser array are also arranged in a stepped form), the differences between optical path length of the laser beam of each laser diode device caused by the several reflecting surfaces of the beam combining element can be compensated, so laser beams parallel with each other, having a same optical path length and having no spacing can be gotten.

Although the invention has been revealed by the preferred embodiments, however, they are not used to limit the invention. The technicians in the invention's art can make changes or modifications without departing from the invention's spirit and scope. So, the protection scope is subject to the defined scope by the claims.

What is claimed is:

1. A laser beam device comprising:
    a laser array comprising several laser diodes arranged in a stepped form, each laser diode having an emitting surface;
    a shaping optical system, set at the emitting side of said laser array;
    a beam combining optical element, set at the emitting side of said shaping optical system, wherein said beam combining optical element comprises several reflecting surfaces corresponding to each of the laser diodes of said laser array, and said reflecting surfaces are arranged in a stepped form;
    wherein said several laser diodes include a first laser diode and a plurality of second laser diodes, said first laser diode positioned farther from the beam combining optical element than the second laser diodes;
    wherein the emitting optical path length from the emitting surface of the first laser diode to said beam combining optical element is substantially equal to the optical path length for each second laser diode, consisting of the sum of the emitting optical path length from the emitting surface of each second laser diode to its corresponding reflecting surface in said beam combining optical element and the reflecting optical path length from said corresponding reflecting surface to the emitting optical path from the first laser diode to said beam combining optical element.

2. The laser beam device of claim 1, wherein several laser diodes of said laser array are arranged along a first direction, the emitting light of each said laser diode is shot out along a second direction, wherein, the spacing along said second direction between several said reflecting surfaces are smaller than the spacing along said first direction between several said laser diodes.

3. The laser beam device of claim 1, wherein the emitting optical path from the laser diode to its corresponding reflecting surface is orthogonal to the reflecting optical path reflected by said reflecting surface.

4. The laser beam device of claim 1, wherein the angle between each said reflecting surface of said beam combining optical element and the emitting direction of the emitting light of said shaping optical system is 45°.

5. The laser beam device of claim 1, wherein said beam combining optical element comprises several reflecting mirrors, each said reflecting mirror is set at the emitting surface of each said laser diodes.

6. The laser beam device of claim 1, wherein said beam combining optical element is a reflecting mirror with several said reflecting surfaces, wherein, each said reflecting surface is set at the emitting surface of each said laser diode.

7. The laser beam device of claim 1, wherein said shaping optical system comprises several fast axis collimating lenses in one-to-one correspondence with said laser diode devices, each said fast axis collimating lens is set at the emitting side of each said laser diode.

* * * * *